Figure 1:
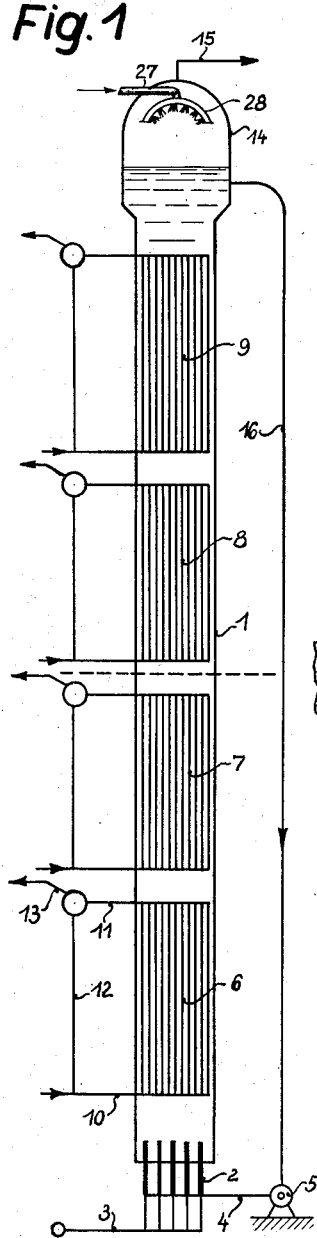

Dec. 25, 1956  H. LEITHÄUSER ET AL  2,775,512
APPARATUS FOR THE PRODUCTION OF HYDROCARBONS
Filed March 2, 1953  3 Sheets-Sheet 1

INVENTORS
HEINZ LEITHÄUSER
WILLY LINDER
EMIL SATTLER
BY
Norman L. Wilson Jr.
ATTORNEY.

Dec. 25, 1956   H. LEITHÄUSER ET AL   2,775,512
APPARATUS FOR THE PRODUCTION OF HYDROCARBONS
Filed March 2, 1953   3 Sheets-Sheet 2

INVENTORS
HEINZ LEITHÄUSER
WILLY LINDER
EMIL SATTLER.
BY Norman L. Wilson Jr
ATTORNEY.

United States Patent Office

2,775,512
Patented Dec. 25, 1956

2,775,512

APPARATUS FOR THE PRODUCTION OF HYDROCARBONS

Heinz Leithäuser, Langenberg, and Willy Linder and Emil Sattler, Essen, Germany, assignors, by mesne assignments, to Koppers Company, Inc., Pittsburgh, Pa., a corporation of Delaware Application March 2, 1953, Serial No. 339,625

2 Claims. (Cl. 23—288)

The present invention relates generally to the production of hydrocarbons by the reaction of carbon monoxide and hydrogen (synthesis gas), or gas mixtures containing these substances, in the presence of catalysts. The invention concerns more particularly a process in which the catalyst is disposed in fixed fashion within a hydrocarbon oil or contact oil or is suspended in finely divided form in the contact oil.

The synthesis gas is passed through the hydrocarbon oil in finely divided form, resulting in an exothermic reaction and, with the assistance of the fixed or suspended catalysts, hydrocarbons which partially dissolve in the hydrocarbon oil and which partially form a mixture of gas and vapors with the residual gas are formed. When the reaction has ended, the hydrocarbons formed are separated from the hydrocarbon oil.

The hydrocarbon oil forms a liquid column in the reaction chamber, through which the synthesis gas is passed so as to come into contact with the contact catalyst situated in suspension or in fixed fashion in the oil. A so-called internal return then takes place, that is to say, the oil moves upwards in the center of the reaction chamber and down again along the walls. It has also been proposed to guide the contact oil from the bottom upwardly through a reaction chamber in a continuous stream, in which case an external circuit is formed, in which the means for effecting the circulation and any additional devices for cooling and purifying the contact oil are situated.

It has now been found that the actual synthesis operation can be improved, and in particular the nature of the hydrocarbons produced may be more effectively influenced, by providing within the reaction chamber a fixed cooling arrangement with which the circulating contact oil and the synthesis gas can be brought into contact during their passage through the reaction chamber.

In accordance with the invention, therefore, the mechanically moved stream of contact oil, circulating after the separation of the gas, and the synthesis gas are introduced into the reaction chamber below a cooling arrangement disposed therein.

Further, experiments have shown that the arrangement of the cooling means within the reaction chamber affords, in addition to the aforesaid advantages, further advantages residing in a more even distribution of the gas in the contact oil. It is known that a certain volume of contact oil must be available for the reaction of the synthesis gas. In the existing reaction chambers provided for these purposes, the contact oil has been used in wide and relatively low reaction vessels. It has now been found that a substantially more uniform distribution of the gas in the contact oil can be obtained by employing, with the same ratio of volume of contact oil to synthesis gas, a tower-like reaction vessel of small diameter and correspondingly great height, and effecting the cooling of the contact oil, or mixture of contact oil and gas, in the reaction chamber in a number of stages in such manner that the mixture of synthesis gas and contact oil successively flows through cooling stages at increasing temperature. The increased speed of flow of the synthesis gas within the reaction chamber resulting from the tower-like construction of the reaction chamber produces, as already stated, a more uniform distribution of the gas in the contact oil and a correspondingly higher reaction rate.

A further advantage of the subdivision of the cooling means provided within the reaction chambers into a number of separate cooling stages resides in that the reaction of the synthesis gas is uniformly distributed over the entire height of the reaction tower of the entire quantity of contact oil. Moreover, owing to the fact that the individual cooling stages have a temperature increasing from the bottom upwards, the reaction can be retarded in the places where the concentration of carbon monoxide and hydrogen is highest, namely in the lower part of the reaction tower, by the application of low temperatures. In accordance with the reduction of the concentration of the reaction substances, the temperature is then increased in the higher zones of the reacting tower, so that the complete reaction between the carbon monoxide and the hydrogen corresponding substantially to equilibrium, is obtained in the neighborhood of the top of the reaction tower.

The subdivision of the cooling means provided within the reaction chamber into a number of cooling stages independently fed with cooling medium can be effected in various ways. All the cooling stages may be arranged one above the other within the same tower. Alternatively, the reaction tower may be subdivided into two or more units in such manner that a circulation of contact oil takes place in each unit, the synthesis gas flowing successively through the individual reaction chambers. At least one internal cooling means is then provided in association with each of these reaction chambers. If the process is carried out in such an arrangement, not only is it possible to maintain different temperatures in the individual reaction chamber units, but the concentration of catalyst therein may also be varied. It is thus possible to vary the chemical nature of the hydrocarbons produced within relatively wide limits by variation of the temperature and the concentration of the catalyst, so that hydrocarbons may be obtained which it has hitherto been impossible to produce by the processes and arrangements hitherto normally employed for the synthesis of hydrocarbons, or which could not hitherto be produced in sufficient quantities by such processes and arrangements.

While a uniform distribution of the gas within the volume of contact oil can be obtained to a certain extent by the subdivision of the internal cooling means into a number of cooling stages and by the tower-like construction of the reaction chamber in accordance with the invention, this distribution can be further improved by providing for feeding the synthesis gas to the reaction chamber at the lower end of the tower-like reaction chamber, one or a series of nozzles associated with liquid nozzles for the supply of the contact oil, the latter being introduced in such manner that the speed of flow of the contact oil in the region of the gas inlet points is different from the speed of flow of the synthesis gas passing into the liquid, and is more especially greater than the speed of the synthesis gas.

Heretofore, the synthesis gas has been introduced through ceramic filter plates or the like from below into the unbroken column of contact oil, and the contact oil escaping at the top has been fed back at the bottom independently thereof. If the contact oil and the synthesis gas are introduced into the reaction chamber in the manner proposed in accordance with the invention, the current of gas leaving the nozzle apertures will be broken up or divided, immediately after leaving the nozzles, into fine bubbles which are uniformly distributed through the liquid column, it having been found that such bubbles do not tend to recombine to form larger gas bubbles or gas pockets.

It is expedient at the same time so to arrange the pump by which the contact oil is circulated that it produces the pressure necessary for the required inlet speed of the oil. If the catalyst is suspended in the contact oil, impeller pumps are particularly suitable for this purpose because they have not the property of centrifuging the specifically heavier finely divided catalyst from the contact oil.

In accordance with a further proposal of the invention a branch stream of the synthesis gas or, if desired, other gases containing carbon monoxide and hydrogen may be introduced in finely divided form into the return pipe for the contact oil, preferably in the direction of flow beyond the circulation pump, for example the impeller pump, in order thus to counteract any excessive reduction of the quantity of dissolved carbon monoxide and hydrogen in the contact oil. In this case, regard must be had to the fact that the reaction taking place at the catalyst also takes place in the return pipe or condenser, although at lower speed than in the reaction vessel itself, so that the quantity of carbon monoxide and hydrogen in the contact oil may in some cases fall to a value at which the action of the catalyst is not ensured, or is not maintained at the required level.

It is furthermore advantageous to provide in the reaction chamber, means for preventing at the upper end of the reaction chamber, that is at the point at which the synthesis gas and the contact oil are separated, deposition of contact oil and especially catalyst on the walls. These means may reside, for example, in introducing at the upper end of the reaction chamber an additional quantity of contact oil which uniformly washes the walls of the reaction chamber and continuously carries away any deposits of catalyst.

In order to facilitate the separation of the contact oil and the gases dissolved therein at the upper end of the reaction tower, it is proposed in accordance with the invention to reduce the speed of flow of the gas-oil mixture at the upper end of the reaction chamber in order thus to effect a general steadying of the flow of liquid. This object may be achieved by increasing that cross-sectional area of the reaction chamber which is available for the flow of liquid at the upper end, for example by increasing the diameter of the tower in this region, or, with a constant diameter, by leaving the upper part of the reaction tower free from inserted elements, for example free from cooling tubes.

As has already been mentioned, a comparatively large ratio of height to diameter is advantageous for the dimensions of the tower-like reaction chamber, because if this ratio is high, that is to say if the tower is relatively slender, a particularly favorable distribution of the synthesis gas in the volume of contact oil is obtained. It has been found that the ratio of height to diameter is preferably chosen as about 10:1, but higher and lower values may quite well be chosen for the ratio of height to diameter.

The temperature at which the process according to the invention is carried out depends upon the catalyst employed and also upon the product which it is desired to obtain by the synthesis. Moreover, the temperature to be chosen depends upon the pressure in the reaction chamber. It has been found that favorable results have been obtained at temperatures below 280° C. if a reaction pressure of about 14–20 atm. is chosen, but economically useful results can be obtained by varying these values in accordance with the particular operating conditions.

The process is illustrated in the drawings.

Figure 1 is a vertical longitudinal section through a reaction chamber constructed in the manner of a tower having a total of four cooling stages.

Figure 2:
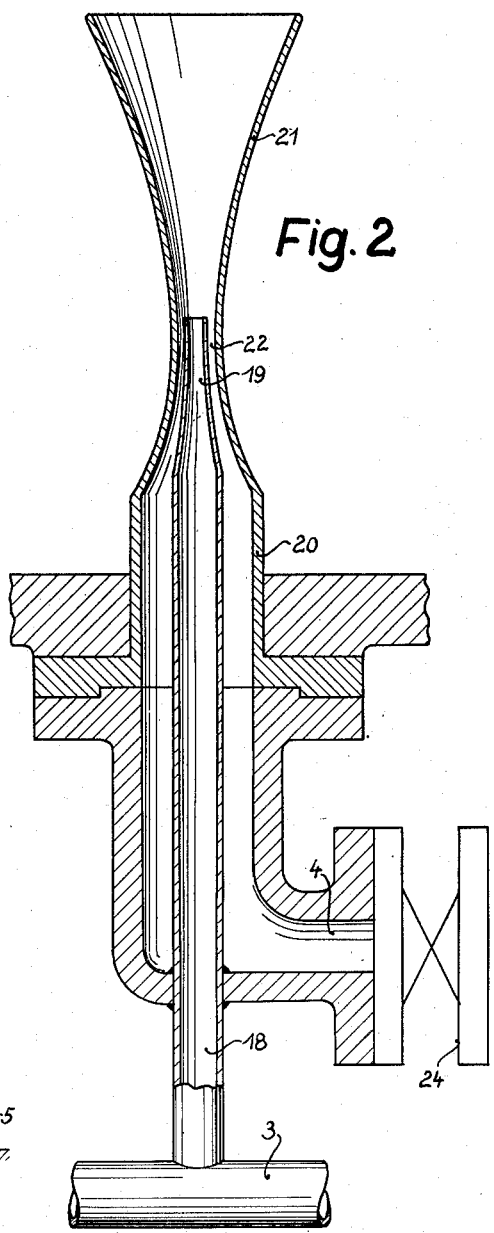
Figure 4:
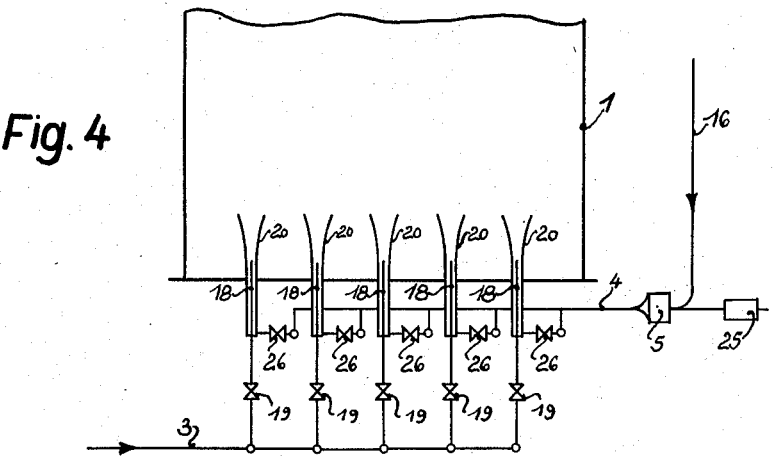
Figure 3:
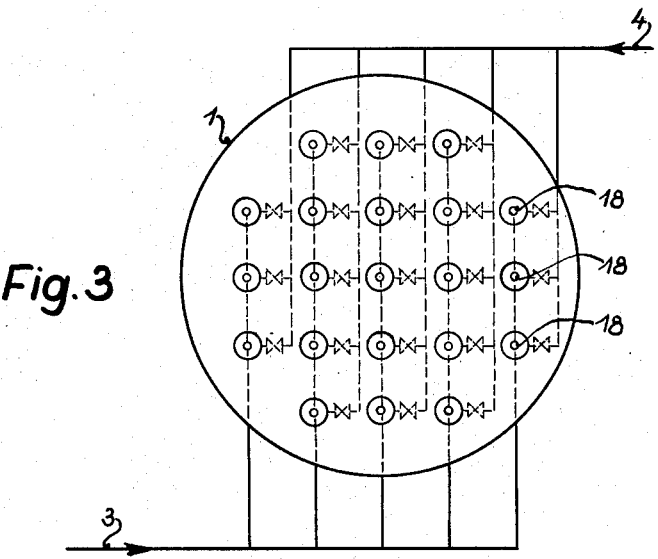
Figure 5:
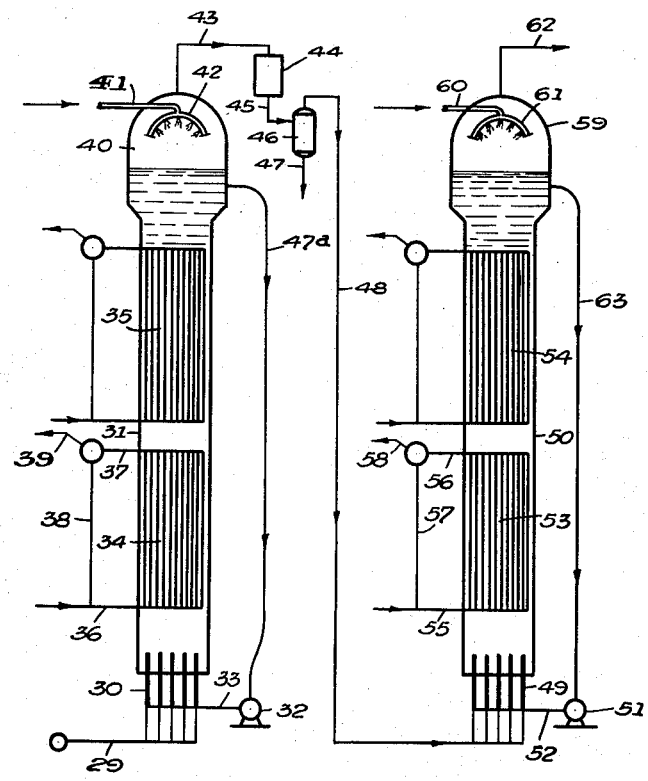

Figure 2 shows a nozzle for the simultaneous introduction of synthesis gas and contact oil into the reaction chamber shown in Figure 1, Figure 3 is a horizontal section through the nozzle base of the reaction tower illustrated in Figure 1, Figure 4 is a vertical section corresponding to Figure 3, and Figure 5 is a vertical longitudinal section through two reaction chambers connected in series, each reaction chamber being provided with two cooling stages.

The reaction tower consists in accordance with Figure 1, of an elongated cylindrical vessel 1 of substantially circular cross-section. Situated at the base of the tower are a number of nozzles 2, to which synthesis gas is fed through the pipe 3 and to which contact oil circulated by a pump 5 is fed through the pipe 4. Provided within the reaction chamber 1 are four cooling devices 6, 7, 8 and 9, which preferably consist of vertical tubes through which a suitable cooling medium, for example water is passed. The cooling medium is supplied through the pipe 10 and then flows through the cooling tubes in the same direction as the mixture of contact oil and synthesis gas introduced at the bottom. The cooling medium absorbs heat from the exothermic reaction of the synthesis gas to form hydrocarbons, the said heat then being discharged with the current of cooling medium through the pipe 11. Part of the cooling medium is directly returned into the circuit through the pipe 12, while another part of the heated cooling medium is fed through the pipe 13 to an external cooling device and thereafter re-introduced into the cooling medium circuit. The mixture of contact oil and synthesis gas is varied in its composition as it travels upwards through the contact tower 1, the hydrogen and carbon monoxide disappearing and hydrocarbons being produced in their place. Provided at the upper end of the contact tower is a widened portion 14 in which a relatively steady flow of liquid is maintained. The contact oil distributing means 28 is disposed in this widened portion 14 and is adapted to uniformly wash the walls of this widened or enlarged section free of catalyst. As shown, contact oil, either freshly introduced or from elsewhere in the reaction zone, is passed through pipe 27 into distributor pipe 28 wherefrom this oil is uniformly distributed onto the walls of this enlarged or widened section. The vapors produced and the unreacted gases leave the reaction tower by way of the pipe 15, while the contact oil is withdrawn through the pipe 16 and is returned into the bottom of the reaction tower by means of the circulation pump 5.

Figure 2 is a vertical longitudinal section through a nozzle provided at the base of the contact tower. The synthesis gas flows from the gas pipe 3 into the inner nozzle tube 18, which terminates in a narrowed portion 19 serving to increase the speed of the current of gas. The inner nozzle tube 18 is surrounded by an outer nozzle tube 20, the cross-section of which is considerably reduced in the region of the mouth of the inner nozzle tube 18 and is then widened again in the manner of a Laval nozzle at 21. The contact oil flows through the annular gap 22 between the inner nozzle tube 18 and the Laval nozzle 21 at great speed and thus breaks up the gas flowing through the inner nozzle tube 18 into extremely fine bubbles, which are then uniformly distributed throughout the volume of contact oil. The contact oil is supplied through the pipe 4, which is controlled by a valve 24.

In Figures 3 and 4, the synthesis gas flows through the pipe 3 into the inner nozzle tubes 18, a valve 19 being provided to ensure that synthesis gas is supplied as equally as possible to all the nozzles. If desired, the said nozzles 19 may also be employed to vary in the required manner the distribution of the synthesis gas over the entire cross-section of the reaction chamber. The contact oil passes from the pipe 16 into the circulation pump 5, which is preferably constructed as an impeller pump. The said circulation pump may also receive fresh contact oil through the pipe 25. The contact oil passes from the circulation pump 5 by way of the pipe 4 and the valves 26 into the annular gap between the inner nozzle tube 18 and the outer nozzle tube 20, the required difference being produced between the speeds of the synthesis gas and the circulating oil by suitably dimensioning the cross-section of this annular gap.

A cooling device not shown here may be provided in the return pipe 16 in association with the cooling system or systems situated in the reaction chamber.

The application of the invention permits, for example, of working up in a reaction vessel having a diameter of 1 m. and a height of 18 m. more than 4,000 cm. of synthesis gas per hour at a reaction pressure of 20 atm.

If it is desirable or expedient to make the reaction tower 1 shorter, it may, for example, be divided at the center (substantially in the region of the dotted line) and the two halves of the tower may be disposed side-by-side, in which case each half must naturally be provided with a so-called nozzle base. The synthesis gas is then introduced into the second reaction unit after having passed through the first unit and does not leave the installation until it has also flowed completely through the second unit. The contact oil itself may also be maintained in circulation in the two halves of the reaction chamber. However, it is expedient to provide in association with each reaction chamber unit a separate contact oil circuit with the corresponding devices, because it is possible in this manner to maintain the circulation of contact oil separately for each unit and to vary the concentration of the catalyst independently in each of the reaction chamber units.

In this case, it may also be expedient to condense the hydrocarbon vapors formed in each unit of the installation and to separate off the condensed products before the synthesis gas is introduced into the next unit of the installation.

In accordance with Figure 5 synthesis gas is fed through pipe 29 to a number of nozzles 30, which nozzles are situated at the base of an elongated cylinder vessel or tower 31. Contact oil is also fed to these nozzles 30 by being circulated by a pump 32 through the pipe 33. Provided within the reaction chamber 31 are two cooling devices 34 and 35, which preferably consist of vertical tubes through which a suitable cooling medium such as water is passed. The cooling medium is furnished through the pipe 36 and flows through the cooling tubes in the same direction as the mixture of contact oil and synthesis gas introduced at the bottom of the tower. The cooling medium is discharged from the cooling tubes through the pipe 37 together with the heat which the cooling medium has absorbed from the endothermic reaction of the synthesis gas to form hydrocarbons. A portion of the cooling medium is directly returned into the circuit through the pipe 38 while another portion of the heated cooling medium is passed through the pipe 39 to an external cooling device (not shown) and thereafter re-introduced into the cooling medium circuit. The mixture of contact oil and synthesis gas is varied in its composition as it passes upwardly through the contact tower 31, and the hydrogen and carbon monoxide disappear and hydrocarbons are produced in their place. A widened portion 40 is provided at the upper end of the contact tower, in which widened portion a relatively steady flow of liquid is maintained. Contact oil is advantageously introduced through pipe 41 to distributing pipe 42, if desired, to uniformly wash the walls of this widened portion free of catalyst. The product vapors and unreacted gases leave the reaction tower through pipe 43 and pass into the cooler 44 to condense liquid hydrocarbons. Contact oil is withdrawn from the widened portion 40 of the tower through the pipe 47a and is passed into the bottom of this reaction tower by means of pump 32. Liquids and gases pass from cooler 44 by means of pipe 45 to separator 46 wherein liquid hydrocarbons are separated from unreacted synthesis gas. The liquid hydrocarbons can be withdrawn through line 47 and the unreacted synthesis gas is passed by means of pipe 48 to a number of nozzles 49 situated at the base of an elongated cylindrical reaction vessel or tower 50. Contact oil circulated by a pump 51 is also fed through a pipe 52 to these nozzles 49. Provided within the reaction chamber 50 are two cooling devices, 53 and 54, which are substantially identical to the cooling devices hereinbefore-described with regard reaction chamber 31. The cooling medium, for example water, is supplied through the pipe 55 and thereafter flows through the cooling tubes in the same direction as the mixture of contact oil and synthesis gas introduced at the bottom. The cooling medium absorbs heat from the exothermic reaction of the synthesis gas and this heat is discharged with the cooling medium through the pipe 56. Part of the cooling medium is directly returned into the circuit through the pipe 57 while another part of the heated cooling medium is passed through the pipe 58 to an external cooling device (not shown) and thereafter re-introduced into the cooling medium circuit. The mixture of contact oil and synthesis gas travels upwardly through the contact tower 50 wherein hydrocarbons are produced. The upper end of the contact tower 50 is also provided with a widened portion 59. Contact oil can also be passed through pipe 60 into distributing pipe 61, if desired, wherefrom it is distributed upon the walls of this widened portion to uniformly wash the catalyst therefrom. The hydrocarbon vapors produced in the unreacted gases leave the reaction tower 50 by means of pipe 62, while the contact oil is withdrawn through the pipe 63 and is returned into the bottom of the reaction tower by means of the recirculation pump 51.

What we claim is:

1. In an apparatus for the production of hydrocarbons by the reaction of carbon monoxide and hydrogen wherein a hydrogenation catalyst is maintained in a liquid column of circulating contact oil through which the synthesis gas is passed and wherein contact oil is moved from the bottom to the top of the liquid column and is returned to the bottom in an external circuit after separation of the gas therefrom, in combination a closed vertical cylindrical reaction vessel having a ratio of height to diameter greater than 10 to 1 for maintaining said liquid column, said vessel having an enlarged top section facilitating separation of contact oil and gas dissolved therein, contact oil distributing means disposed in said enlarged top section adapted uniformly to wash the walls of said enlarged section free of catalyst, a plurality of indirect cooling means internally disposed substantially equidistantly along the length of the column, synthesis gas-contact oil inlet means in the bottom of said reaction vessel comprising a gas inlet nozzle axially disposed within a concentric contact oil inlet venturi tube, said gas inlet nozzle having a tapering gas outlet terminating in said venturi and means for externally circulating contact oil from the enlarged top section of the reaction vessel to said contact oil inlet venturi tube.

2. The apparatus of claim 1 wherein at least two structurally and functionally independent tower-like reaction chambers are arranged side-by-side, through which synthesis gas flows successively and in the interior of which a cooling means consisting of at least two units disposed one above the other is provided.

References Cited in the file of this patent

UNITED STATES PATENTS

| 1,792,003 | Dickey et al. | Feb. 10, 1931 |
| 1,907,455 | Stenzel | May 9, 1933 |

(Other references on following page)

UNITED STATES PATENTS

| | | |
|---|---|---|
| 2,433,255 | Atwell | Dec. 23, 1947 |
| 2,438,029 | Atwell | Mar. 16, 1948 |
| 2,440,109 | Moore | Apr. 20, 1940 |
| 2,532,756 | Brunjes et al. | Dec. 5, 1950 |
| 2,662,911 | Dorschner et al. | Dec. 15, 1953 |

OTHER REFERENCES

Storch et al.: "The Fischer-Tropsch and Related Syntheses," page 411 (1951), John Wiley & Sons, Inc., New York.